(12) United States Patent
Shibuya

(10) Patent No.: US 8,780,414 B2
(45) Date of Patent: Jul. 15, 2014

(54) IMAGE PROCESSING APPARATUS, IMAGE PROCESSING METHOD, AND COMPUTER-READABLE MEDIUM FOR IMAGE DATA COMPRESSION

(75) Inventor: Yuichiro Shibuya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 13/028,256

(22) Filed: Feb. 16, 2011

(65) Prior Publication Data

US 2011/0229027 A1 Sep. 22, 2011

(30) Foreign Application Priority Data

Mar. 16, 2010 (JP) ................................. 2010-059924

(51) Int. Cl.
*G06K 15/02* (2006.01)

(52) U.S. Cl.
USPC .......................................... 358/3.06; 358/1.9

(58) Field of Classification Search
USPC ................................................ 358/3.06, 1.9
See application file for complete search history.

(56) References Cited

U.S. PATENT DOCUMENTS

| | | | | |
|---|---|---|---|---|
| 5,231,482 | A * | 7/1993 | Murakami et al. | 358/500 |
| 5,933,249 | A | 8/1999 | Shimura et al. | 358/429 |
| 6,243,416 | B1 * | 6/2001 | Matsushiro et al. | 375/240 |
| 7,844,120 | B2 | 11/2010 | Yamamoto | 382/232 |
| 2006/0181720 | A1 * | 8/2006 | Kakutani | 358/1.9 |
| 2008/0259359 | A1 * | 10/2008 | Tamura | 358/1.1 |
| 2009/0148059 | A1 * | 6/2009 | Matsuda | 382/251 |

FOREIGN PATENT DOCUMENTS

| | | |
|---|---|---|
| JP | 7-236062 A | 9/1995 |
| JP | 10-257488 A | 9/1998 |
| JP | 2002-271791 A | 9/2002 |
| JP | 2004-104621 A | 4/2004 |
| JP | 2007-143082 A | 6/2007 |

OTHER PUBLICATIONS

U.S. Appl. No. 13/023,215, filed Feb. 8, 2011.
U.S. Appl. No. 13/023,209, filed Feb. 8, 2011.

* cited by examiner

*Primary Examiner* — Steven Kau
*Assistant Examiner* — Andrew H Lam
(74) *Attorney, Agent, or Firm* — Fitzpatrick, Cella, Harper & Scinto

(57) ABSTRACT

An image processing apparatus comprises: a division unit which divides the input image data into blocks each including a predetermined number of pixels; a determination unit which determines whether the number of colors that is the number of types of colors of the pixels included in the block is not less than a predetermined number; a pseudo halftone processing unit which performs pseudo halftone processing of image data for the block if the number of colors in the block is not less than the predetermined number; an acquisition unit which acquires a color arrangement and color information in each of the block, in which the determination unit determines that the number of colors is less than the predetermined number, and the block having undergone the pseudo halftone processing; and a storage unit which stores the color arrangement and the color information, acquired, for each block.

8 Claims, 24 Drawing Sheets

FIG. 3
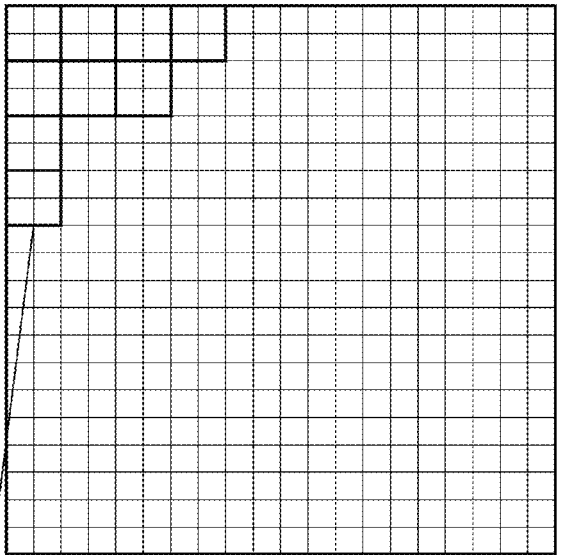
IMAGE
| | |
|---|---|
|  | SAME COLOR FOR ALL PIXELS : ONE PATTERN |
|  | TWO COLORS: SEVEN PATTERNS |
| 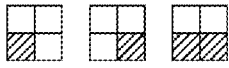 | THREE COLORS: SIX PATTERNS |
| 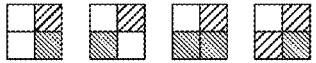 | DIFFERENT COLORS FOR ALL PIXELS: ONE PATTERN |

F I G. 4
| IMAGE | FLAG |
|---|---|
|  | 0 |
|  | 1 |
|  | 2 |
|  | 3 |
|  | 4 |
|  | 5 |
|  | 6 |
|  | 7 |
|  | 8 |
|  | 9 |
|  | A |
|  | B |
|  | C |
|  | D |
|  | E |
|  | F |
| (MULTILEVEL) | |

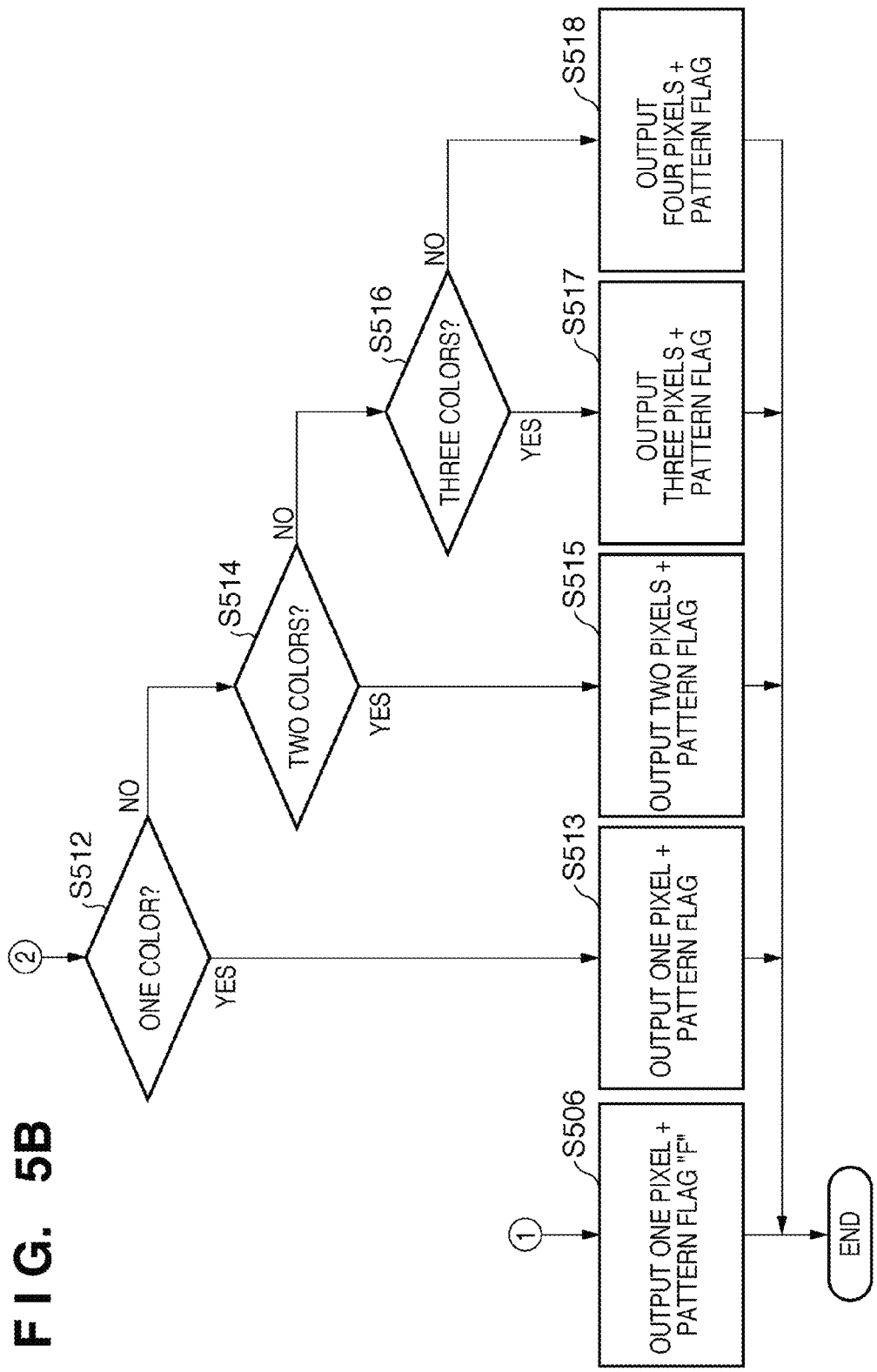

FIG. 6

| | 1-2 | 1-3 | 1-4 | 2-3 | 2-4 | 3-4 |
|---|---|---|---|---|---|---|
| | bit 0 | bit 1 | bit 2 | bit 3 | bit 4 | bit 5 |

| IMAGE | COMPARISON RESULT | | | | | | PATTERN FLAG |
|---|---|---|---|---|---|---|---|
| | 1 | 1 | 1 | 1 | 1 | 1 | 0 |
| | 0 | 1 | 1 | 0 | 0 | 1 | 1 |
| | 0 | 0 | 1 | 1 | 0 | 0 | 2 |
| | 0 | 1 | 0 | 0 | 1 | 0 | 3 |
| | 0 | 0 | 0 | 1 | 1 | 1 | 4 |
| | 1 | 0 | 1 | 0 | 1 | 0 | 5 |
| | 1 | 1 | 0 | 1 | 0 | 0 | 6 |
| | 1 | 0 | 0 | 0 | 0 | 1 | 7 |
| | 0 | 1 | 0 | 0 | 0 | 0 | 8 |
| | 0 | 0 | 1 | 0 | 0 | 0 | 9 |
| | 0 | 0 | 0 | 0 | 0 | 1 | A |
| | 0 | 0 | 0 | 1 | 0 | 0 | B |
| | 0 | 0 | 0 | 0 | 1 | 0 | C |
| | 1 | 0 | 0 | 0 | 0 | 0 | D |
| | 0 | 0 | 0 | 0 | 0 | 0 | E |

FIG. 8A

| 28 | 84 | 168 |
|---|---|---|
| 56 | 140 | 224 |
| 104 | 196 | 252 |

FIG. 8B

| 21 | 77 | 161 |
|---|---|---|
| 49 | 133 | 214 |
| 97 | 189 | 245 |

FIG. 8C

| 14 | 70 | 154 |
|---|---|---|
| 42 | 118 | 210 |
| 98 | 182 | 238 |

FIG. 8D

| 7 | 63 | 147 |
|---|---|---|
| 35 | 111 | 203 |
| 91 | 175 | 231 |

FIG. 11

| COORDINATE POSITION (X, Y) | PATTERN FLAG | DATA SIZE | COORDINATE POSITION (X, Y) | PATTERN FLAG | DATA SIZE |
|---|---|---|---|---|---|
| (0.0) | F | 28 | (4.0) | F | 28 |
| (0.1) | F | 28 | (4.1) | 6 | 28 |
| (0.2) | F | 28 | (4.2) | F | 28 |
| (0.3) | F | 28 | (4.3) | F | 28 |
| (0.4) | F | 28 | (4.4) | F | 28 |
| (0.5) | F | 28 | (4.5) | F | 28 |
| (0.6) | F | 28 | (4.6) | F | 28 |
| (0.7) | F | 28 | (4.7) | 0 | 12 |
| (1.0) | F | 28 | (5.0) | F | 28 |
| (1.1) | 6 | 20 | (5.1) | 1 | 20 |
| (1.2) | F | 28 | (5.2) | F | 28 |
| (1.3) | F | 28 | (5.3) | F | 28 |
| (1.4) | F | 28 | (5.4) | F | 28 |
| (1.5) | F | 28 | (5.5) | F | 28 |
| (1.6) | F | 28 | (5.6) | F | 28 |
| (1.7) | 0 | 12 | (5.7) | 0 | 12 |
| (2.0) | F | 28 | (6.0) | F | 28 |
| (2.1) | 1 | 20 | (6.1) | 3 | 20 |
| (2.2) | F | 28 | (6.2) | F | 28 |
| (2.3) | F | 28 | (6.3) | F | 28 |
| (2.4) | F | 28 | (6.4) | F | 28 |
| (2.5) | F | 28 | (6.5) | F | 28 |
| (2.6) | F | 28 | (6.6) | F | 28 |
| (2.7) | 0 | 12 | (6.7) | 0 | 12 |
| (3.0) | F | 28 | (7.0) | F | 28 |
| (3.1) | 3 | 20 | (7.1) | F | 28 |
| (3.2) | F | 28 | (7.2) | F | 28 |
| (3.3) | F | 28 | (7.3) | F | 28 |
| (3.4) | F | 28 | (7.4) | F | 28 |
| (3.5) | F | 28 | (7.5) | F | 28 |
| (3.6) | F | 28 | (7.6) | F | 28 |
| (3.7) | 0 | 12 | (7.7) | F | 28 |
|  |  |  | TOTAL |  | 1648 |

FIG. 15

| COORDINATE POSITION (X, Y) | PATTERN FLAG | DATA SIZE | COORDINATE POSITION (X, Y) | PATTERN FLAG | DATA SIZE |
|---|---|---|---|---|---|
| (0.0) | 0 | 12 | (4.0) | 0 | 12 |
| (0.1) | 0 | 12 | (4.1) | 6 | 20 |
| (0.2) | 0 | 12 | (4.2) | F | 28 |
| (0.3) | 0 | 12 | (4.3) | F | 28 |
| (0.4) | 0 | 12 | (4.4) | F | 28 |
| (0.5) | 0 | 12 | (4.5) | F | 28 |
| (0.6) | 0 | 12 | (4.6) | F | 28 |
| (0.7) | 0 | 12 | (4.7) | 0 | 12 |
| (1.0) | 0 | 12 | (5.0) | 0 | 12 |
| (1.1) | 6 | 20 | (5.1) | 1 | 20 |
| (1.2) | F | 28 | (5.2) | F | 28 |
| (1.3) | F | 28 | (5.3) | F | 28 |
| (1.4) | F | 28 | (5.4) | F | 28 |
| (1.5) | F | 28 | (5.5) | F | 28 |
| (1.6) | F | 28 | (5.6) | F | 28 |
| (1.7) | 0 | 12 | (5.7) | 0 | 12 |
| (2.0) | 0 | 12 | (6.0) | 0 | 12 |
| (2.1) | 1 | 20 | (6.1) | 3 | 20 |
| (2.2) | F | 28 | (6.2) | F | 28 |
| (2.3) | F | 28 | (6.3) | F | 28 |
| (2.4) | F | 28 | (6.4) | F | 28 |
| (2.5) | F | 28 | (6.5) | F | 28 |
| (2.6) | F | 28 | (6.6) | F | 28 |
| (2.7) | 0 | 12 | (6.7) | 0 | 12 |
| (3.0) | 0 | 12 | (7.0) | 0 | 12 |
| (3.1) | 3 | 20 | (7.1) | 0 | 12 |
| (3.2) | F | 28 | (7.2) | 0 | 12 |
| (3.3) | F | 28 | (7.3) | 0 | 12 |
| (3.4) | F | 28 | (7.4) | 0 | 12 |
| (3.5) | F | 28 | (7.5) | 0 | 12 |
| (3.6) | F | 28 | (7.6) | 0 | 12 |
| (3.7) | 0 | 12 | (7.7) | 0 | 12 |
| | | | TOTAL | | 1296 |

FIG. 18A

| COORDINATE POSITION (X, Y) | PATTERN FLAG | DATA SIZE | COORDINATE POSITION (X, Y) | PATTERN FLAG | DATA SIZE |
|---|---|---|---|---|---|
| (0.0) | F | 29 | (4.0) | F | 29 |
| (0.1) | F | 5 | (4.1) | 6 | 21 |
| (0.2) | F | 5 | (4.2) | F | 29 |
| (0.3) | F | 5 | (4.3) | F | 5 |
| (0.4) | F | 5 | (4.4) | F | 5 |
| (0.5) | F | 5 | (4.5) | F | 5 |
| (0.6) | F | 5 | (4.6) | F | 5 |
| (0.7) | F | 5 | (4.7) | 0 | 13 |
| (1.0) | F | 5 | (5.0) | F | 29 |
| (1.1) | 6 | 21 | (5.1) | 1 | 21 |
| (1.2) | F | 29 | (5.2) | F | 29 |
| (1.3) | F | 5 | (5.3) | F | 5 |
| (1.4) | F | 5 | (5.4) | F | 5 |
| (1.5) | F | 5 | (5.5) | F | 5 |
| (1.6) | F | 5 | (5.6) | F | 5 |
| (1.7) | 0 | 13 | (5.7) | 0 | 13 |
| (2.0) | F | 29 | (6.0) | F | 29 |
| (2.1) | 1 | 21 | (6.1) | 3 | 21 |
| (2.2) | F | 29 | (6.2) | F | 29 |
| (2.3) | F | 5 | (6.3) | F | 5 |
| (2.4) | F | 5 | (6.4) | F | 5 |
| (2.5) | F | 5 | (6.5) | F | 5 |
| (2.6) | F | 5 | (6.6) | F | 5 |
| (2.7) | 0 | 21 | (6.7) | 0 | 13 |
| (3.0) | F | 29 | (7.0) | F | 29 |
| (3.1) | 3 | 21 | (7.1) | F | 5 |
| (3.2) | F | 29 | (7.2) | F | 5 |
| (3.3) | F | 5 | (7.3) | F | 5 |
| (3.4) | F | 5 | (7.4) | F | 5 |
| (3.5) | F | 5 | (7.5) | F | 5 |
| (3.6) | F | 5 | (7.6) | F | 5 |
| (3.7) | 0 | 13 | (7.7) | F | 5 |
| | | | TOTAL | | 784 |

FIG. 18B

| COORDINATE POSITION (X, Y) | PATTERN FLAG | DATA SIZE | COORDINATE POSITION (X, Y) | PATTERN FLAG | DATA SIZE |
|---|---|---|---|---|---|
| (0.0) | 0 | 13 | (4.0) | 0 | 5 |
| (0.1) | 0 | 5 | (4.1) | 6 | 21 |
| (0.2) | 0 | 5 | (4.2) | F | 29 |
| (0.3) | 0 | 5 | (4.3) | F | 5 |
| (0.4) | 0 | 5 | (4.4) | F | 5 |
| (0.5) | 0 | 5 | (4.5) | F | 5 |
| (0.6) | 0 | 5 | (4.6) | F | 29 |
| (0.7) | 0 | 5 | (4.7) | 0 | 13 |
| (1.0) | 0 | 5 | (5.0) | 0 | 5 |
| (1.1) | 6 | 21 | (5.1) | 1 | 21 |
| (1.2) | F | 29 | (5.2) | F | 29 |
| (1.3) | F | 5 | (5.3) | F | 5 |
| (1.4) | F | 5 | (5.4) | F | 5 |
| (1.5) | F | 5 | (5.5) | F | 5 |
| (1.6) | F | 5 | (5.6) | F | 5 |
| (1.7) | 0 | 13 | (5.7) | 0 | 13 |
| (2.0) | 0 | 5 | (6.0) | 0 | 5 |
| (2.1) | 1 | 21 | (6.1) | 3 | 21 |
| (2.2) | F | 29 | (6.2) | F | 29 |
| (2.3) | F | 5 | (6.3) | F | 5 |
| (2.4) | F | 5 | (6.4) | F | 5 |
| (2.5) | F | 5 | (6.5) | F | 5 |
| (2.6) | F | 5 | (6.6) | F | 5 |
| (2.7) | 0 | 13 | (6.7) | 0 | 13 |
| (3.0) | 0 | 5 | (7.0) | 0 | 5 |
| (3.1) | 3 | 21 | (7.1) | 0 | 5 |
| (3.2) | F | 29 | (7.2) | 0 | 5 |
| (3.3) | F | 5 | (7.3) | 0 | 5 |
| (3.4) | F | 5 | (7.4) | 0 | 5 |
| (3.5) | F | 5 | (7.5) | 0 | 5 |
| (3.6) | F | 5 | (7.6) | 0 | 5 |
| (3.7) | 0 | 13 | (7.7) | 0 | 5 |
| | | | TOTAL | | 640 |

IMAGE PROCESSING APPARATUS, IMAGE PROCESSING METHOD, AND COMPUTER-READABLE MEDIUM FOR IMAGE DATA COMPRESSION

BACKGROUND OF THE INVENTION

1. Field of the Invention

The present invention relates to an image processing apparatus, image processing method, and computer-readable medium which perform image data compression processing of compressing an image for each predetermined block, image processing for the data compressed for each predetermined block, and processing of restoring the processed data to the original image data.

2. Description of the Related Art

High-resolution color images have conventionally been in high demand. To meet the demands to improve image quality, it is becoming a common practice to process, by a digital multi-functional peripheral, images with resolutions of 1,200 dpi (dots per inch) or more. To save space on a memory/hard disk and to shorten the time taken to write data on it, not only a digital multi-functional peripheral but also image processing apparatuses (digital camera and facsimile apparatus) which process these images compress color image data to achieve a cost reduction and a speedup. Among color still image compression schemes, a JPEG scheme which uses discrete cosine transformation and a scheme which uses wavelet transformation have been widely and conventionally employed.

With an increase in resolution, the number of pixels which require image processing has dramatically increased, so the processing load is becoming increasing. For example, upon doubling the resolution from 600 dpi to 1,200 dpi, the number of pixels to be processed quadruples. When the above-mentioned image compression is employed, processing of decoding the compressed data becomes necessary to refer to and convert the pixel data with the doubled resolution. In other words, image processing cannot be performed for the compressed data intact, so its decoding processing inevitably becomes necessary. This makes it necessary to process all pixels in the high-resolution data for each pixel, thus prolonging the processing time.

As techniques of compressing pixel data, a known run-length compression scheme of storing a plurality of pixel data and their runs, and a technique (see, for example, Japanese Patent Laid-Open No. 10-257488) of compressing pixel data by detecting an edge for each block and storing two colors of this edge, for example, have been disclosed.

Also, in Japanese Patent Laid-Open No. 2007-143082, image data having undergone pseudo halftone processing using a dither pattern is divided into predetermined blocks to generate compressed data using the array pattern, representative value, and position data of the image data within each block. With this proposed method, the compression effect is enhanced. As a method of encoding an image having a mixture of, for example, a text and a photo, histograms are obtained for R, G, and B, respectively, of data in each block. A block with a histogram which exhibits distribution characteristics having two peaks is determined as a two-color region, and that with a dispersed histogram is determined as a multilevel region, thereby performing encoding using an encoding scheme suitable for the characteristics of each block.

In Japanese Patent Laid-Open No. 7-236062, a histogram is obtained for image data, and it is determined based on the histogram whether the image data is a region of a text/line image or nature image. With this proposed method, the compression ratio is improved while maintaining a given image quality by changing the encoding method in accordance with the determination result.

The compression scheme to compress image data for each block can compress it at a higher compression ratio as the number of colors in a region obtained by block division decreases or the same pattern continues longer. Conversely, it is difficult to compress an image (FIG. 19A) such as a nature image that contains a large amount of edge information at a high compression ratio.

On the other hand, image data having undergone pseudo halftone processing has a smaller number of gray levels than multiple gray-level image data, and therefore can be compressed at a relatively high compression ratio even if it represents an image such as a nature image containing a large amount of edge information. FIG. 19B shows multiple gray-level image data obtained by enlarging a portion 1900 shown in FIG. 19A, and FIG. 19C shows image data obtained by performing pseudo halftone processing of the portion 1900 shown in FIG. 19A. Obviously, the data shown in FIG. 19C has coarser pixels and therefore has a smaller amount of information than that shown in FIG. 19B. However, in data in which the halftone density continues (for example, data in which gray continues alone), such as a halftone text, the number of colors increases upon dither processing, thus lowering the compression ratio. As can be seen from a comparison between a portion 2000 shown in FIG. 19B and a portion 2100 shown in FIG. 19C, pixels with the same density continue longer in the former than in the latter.

SUMMARY OF THE INVENTION

The present invention has been made in consideration of the foregoing problems, and can compress high-resolution image data at a high compression ratio without deteriorating the image quality.

According to one aspect of the present invention, there is provided an image processing apparatus which compresses input image data, comprising: a division unit which divides the input image data into blocks each including a predetermined number of pixels; a determination unit which determines whether the number of colors that is the number of types of colors of the pixels included in the block is not less than a predetermined number; a pseudo halftone processing unit which performs pseudo halftone processing of image data for the block if the determination unit determines that the number of colors in the block is not less than the predetermined number; an acquisition unit which acquires a color arrangement and color information in each of the block, in which the determination unit determines that the number of colors is less than the predetermined number, and the block having undergone the pseudo halftone processing by the pseudo halftone processing unit; and a storage unit which stores the color arrangement and the color information, acquired by the acquisition unit, for each block.

According to another aspect of the present invention, there is provided an image processing apparatus which compresses input image data, comprising: a division unit which divides the input image data into blocks each including a predetermined number of pixels; a determination unit which determines whether the number of colors that is the number of types of colors of the pixels included in the block is a predetermined number and the color is a predetermined color; a pseudo halftone processing unit which performs pseudo halftone processing of image data for the block if the determination unit determines that a condition in which the number of colors in the block is the predetermined number and the color is the predetermined color is not satisfied; an acquisition unit which acquires a color arrangement and color information in each of the block, in which the determination unit determines that the number of colors is the predetermined number and the color is the predetermined color, and the block having undergone the pseudo halftone processing by the pseudo halftone processing unit; and a storage unit which stores the color arrangement acquired by the acquisition unit and the color information which is acquired by the acquisition unit and included in each of the blocks.

According to another aspect of the present invention, there is provided a control method for an image processing apparatus which compresses input image data, comprising: a division step of causing a division unit of the image processing apparatus to divide the input image data into blocks each including a predetermined number of pixels; a determination step of causing a determination unit of the image processing apparatus to determine whether the number of colors that is the number of types of colors of the pixels included in the block is not less than a predetermined number; a pseudo halftone processing step of causing a pseudo halftone processing unit of the image processing apparatus to perform pseudo halftone processing of image data for the block if it is determined in the determination step that the number of colors in the block is not less than the predetermined number; an acquisition step of causing an acquisition unit of the image processing apparatus to acquire a color arrangement and color information in each of the block, in which it is determined in the determination step that the number of colors is less than the predetermined number, and the block having undergone the pseudo halftone processing in the pseudo halftone processing step; and a storage step of causing a storage unit of the image processing apparatus to store the color arrangement and the color information, acquired in the acquisition step, for each block.

According to another aspect of the present invention, there is provided a computer-readable medium storing a program for causing a computer to function as: a division unit which divides the input image data into blocks each including a predetermined number of pixels; a determination unit which determines whether the number of colors that is the number of types of colors of the pixels included in the block is not less than a predetermined number; a pseudo halftone processing unit which performs pseudo halftone processing of image data for the block if the determination unit determines that the number of colors in the block is not less than the predetermined number; an acquisition unit which acquires a color arrangement and color information in each of the block, in which the determination unit determines that the number of colors is less than the predetermined number, and the block having undergone the pseudo halftone processing by the pseudo halftone processing unit; and a storage unit which stores the color arrangement and the color information, acquired by the acquisition unit, for each block.

According to the present invention, it is possible to compress image data at a high compression ratio. More particularly, it is possible to compress even an image containing a text image in a nature image at a high compression ratio.

Further features of the present invention will become apparent from the following description of exemplary embodiments with reference to the attached drawings.

BRIEF DESCRIPTION OF THE DRAWINGS

FIG. 3 is a view showing the patterns of blocks obtained upon dividing an image according to the embodiment;

FIG. 4 is a view showing the patterns of blocks and their corresponding identifiers according to the embodiment;

FIGS. 5A and 5B are flowcharts showing the sequence of image compression according to the first embodiment;

FIG. 6 is a view showing conversion of the patterns of blocks into flags according to the embodiment;

FIGS. 8A, 8B, 8C, and 8D are views illustrating examples of dither matrices according to the embodiment;

FIG. 11 is a table showing the configuration of compressed data according to the first embodiment;

FIG. 15 is a table showing the configuration of compressed data according to the second embodiment;

FIGS. 18A and 18B are tables showing the configurations of compressed data according to the third embodiment.

DESCRIPTION OF THE EMBODIMENTS

First Embodiment

Figure 1:
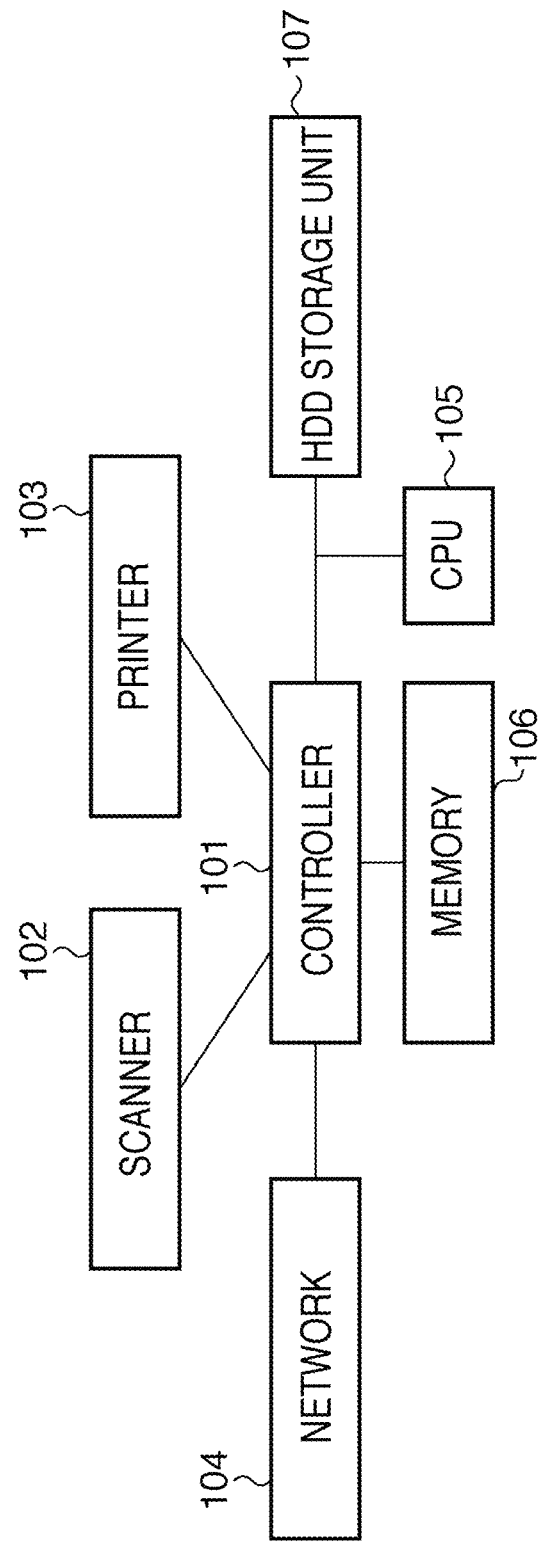
FIG. 1 is a block diagram showing an overview of an MFP system according to an embodiment of the present invention.

Modes for carrying out the present invention will be described below with reference to the accompanying drawings. FIG. 1 is a block diagram showing the overall configuration of a digital multi-functional system (to be referred to as an MFP hereinafter) which scans, prints, and copies according to an embodiment of the present invention. A controller 101 is connected to a scanner 102 serving as an image input device, a printer 103 serving as an image output device, and a network 104 such as a LAN or a public line (WAN) to input/output image information or device information and perform image rasterization of PDL data. A CPU 105 serves as a processor which controls the overall system. The CPU 105 reads out programs stored in a memory 106 and HDD storage unit 107, and executes these programs. The memory 106 serves as a system working memory for operating the CPU 105, and also serves as an image memory for temporarily storing image data. The HDD storage unit 107 serves as a hard disk drive and stores system software and image data.

Figure 2:
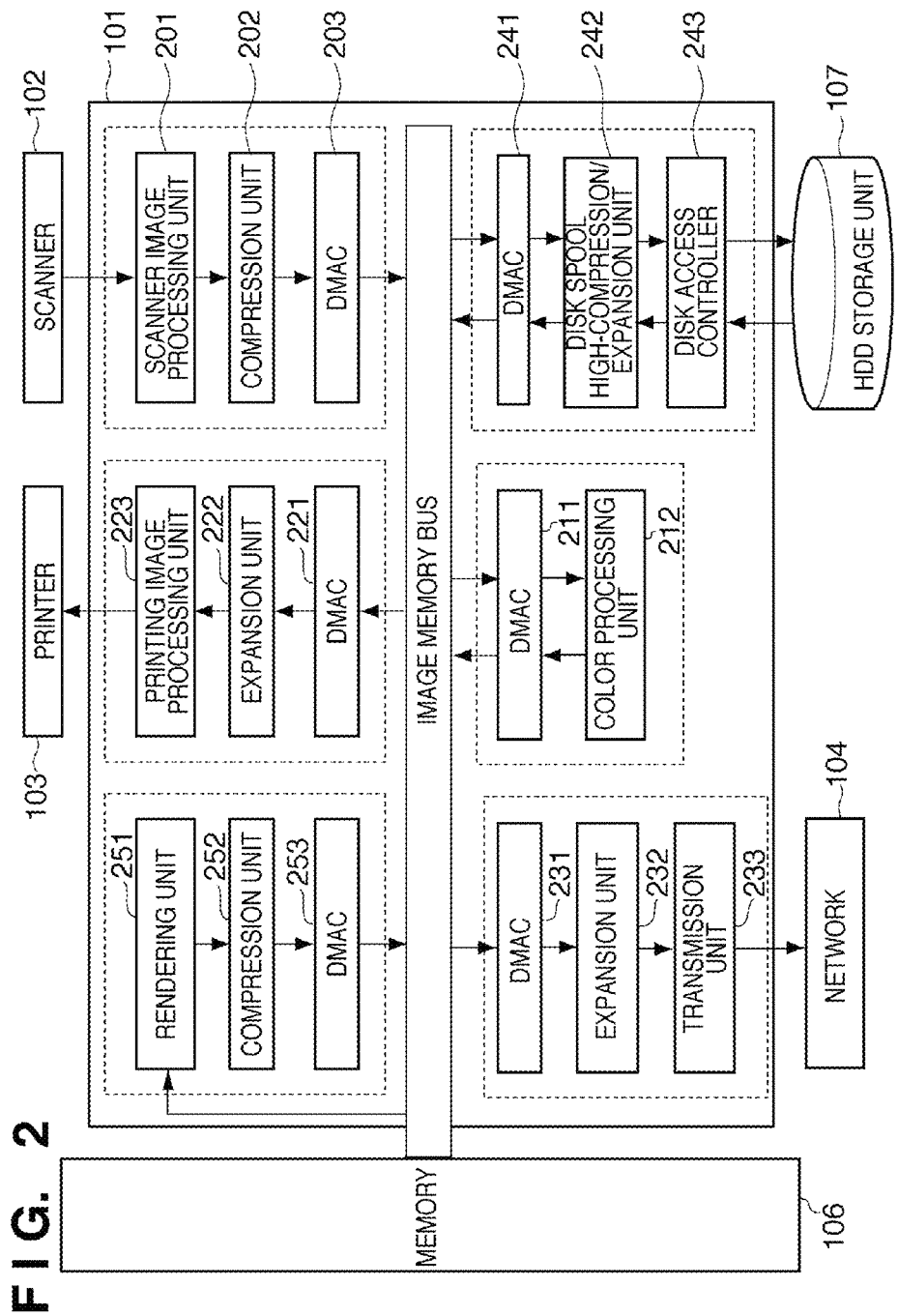
FIG. 2 is a block diagram showing an overview of a controller according to the embodiment.

The operation of the controller 101 shown in FIG. 1 will be described in detail with reference to FIG. 2. A case where scanned data is read will be described first. Upon receiving read image data in three colors: R, G, and B (Red, Green, and Blue) from the scanner 102, the controller 101 uses a scanner image processing unit 201 to perform image processing such as shading processing and filter processing first. The controller 101 uses a compression unit 202 to perform image compression processing for the processed data. The controller 101 stores the compressed data in the memory 106 via a DMAC (Direct Memory Access Controller) 203.

In printing the scanned data, the compressed data stored in the memory 106 is input to a color processing unit 212 via a DMAC 211, and converted into that in a CMYK (Cyan, Magenta, Yellow, and Black) color space. Color processing for density adjustment and adjustment which uses, for example, printer gamma correction is performed for the C, M, Y, and K values of the converted data, and the processed data is stored again in the memory 106 via the DMAC 211. To perform image processing for printing, the compressed data stored in the memory 106 is read via a DMAC 221 and rasterized into raster image data by a rasterization unit 222. The raster CMYK image data is input to a printing image processing unit 223, undergoes area coverage modulation processing (screen processing) using the dither method or the error diffusion method by the printing image processing unit 223, and is output to the printer 103. Although the use of the dither method will be taken as an example in this embodiment, the present invention is not particularly limited to this, and area coverage modulation processing may be performed using the error diffusion method or other methods as needed.

In transmitting the scanned data to the network, the compressed data stored in the memory 106 is input to the color processing unit 212 via the DMAC 211, and undergoes color conversion. More specifically, the compressed data undergoes, for example, display gamma adjustment and sheet self-color adjustment, and is converted into that in a YCbCr (luminance, blue color difference, and red color difference) color space. The converted data is stored again in the memory 106 via the DMAC 211. To perform image processing for transmission, the compressed data stored in the memory 106 is read via a DMAC 231, and rasterized into raster image data by a rasterization unit 232. A transmission unit 233 performs JPEG compression processing for the raster YCbCr image data in case of color image transmission, or performs JBIG compression processing for the raster YCbCr image data by binarizing its Y data in case of monochrome binary image transmission, and outputs the compressed data to the network 104.

In storing the scanned data, the compressed data stored in the memory 106 is input to a disk spool high-compression/expansion unit 242 via a DMAC 241. The disk spool high-compression/expansion unit 242 has a writing speed on the HDD, which is slower than that on the memory, and therefore performs JPEG compression at a higher compression ratio. The compressed data is stored in the HDD storage unit 107 via a disk access controller 243. Note that processing reverse to the foregoing processing is performed in expanding the stored data to the memory again.

A case in which PDL data is written on the memory will be described next. Although not shown in FIG. 2, PDL data sent from the network in FIG. 1 is interpreted by the CPU 105, and a display list is output to the memory 106. The display list stored in the memory 106 is rendered into raster RGB image data by a rendering unit 251, and undergoes image compression processing by a compression unit 252. The compressed data is stored in the memory 106 via a DMAC 253. The PDL image data can be printed, transmitted to the network, and stored by processing similar to that for the scanned data.

[Compression of Raster Image Data]

The compression unit 252 for raster image data as a feature of this embodiment will be described in detail hereinafter. First, a raster image for each page is divided into blocks of 2×2 pixels, and data compression is performed for each block. Although the following description assumes a block of 2×2 pixels as a minimum unit, the present invention is not limited to this, and the block size may be changed as needed. At this time, the size and other specifications of the data to be described hereinafter are appropriately adjusted in accordance with the block size.

Combinations of colors, that occur in accordance with the number of colors that is the number of types of colors which occupy data of 2×2=4 pixels, will be described before a description of processing. In this case, a block includes four pixels, so a maximum of four colors occupy the block, and only combinations of one to four colors exist in the block. Possible combinations (patterns) of these four colors will be described with reference to FIG. 3. First, when the block has only one color, the four pixels have the same color, so only one combination exists. A case in which the block has two colors will be considered next. When two colors are laid out in the four pixels assuming that the upper left pixel has a first color and the other color is a second color, the first or second color is assigned to the three pixels other than the upper left pixel, so a total of seven combinations are possible upon excluding a combination when the four pixels have the same color. A case in which the block has three colors will be considered. When three colors are laid out in the four pixels, one of the three colors is used twice, so the number of combinations when two out of the four pixels have the same color need only be obtained. In other words, in case of three colors, two coordinate positions are selected from the four coordinate positions, so a total of six combinations are possible. Lastly, when the block has four colors, only one pattern exists as in case of only one color. A total of 15 patterns are possible upon counting up the number of patterns in all cases of one to four colors.

Figure 19A:
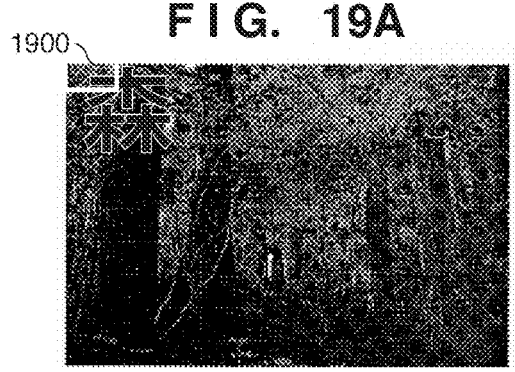
FIGS. 19A, 19B, and 19C are views for explaining the problems to be solved by the present invention.
Figure 19B:
Figure 19C:
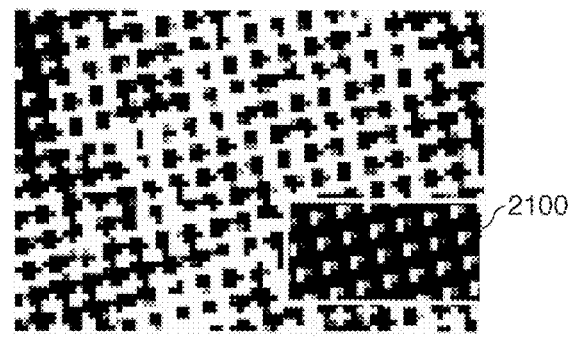

In this embodiment, it is necessary to discriminate not only the patterns of these pseudo halftone images but also those of multiple gray-level images. Only when a block with a continuous halftone density has only one color (for example, a text in only one color), as in case of FIG. 19A or 19B, the multiple gray-level image is compressed intact without being converted into a pseudo halftone image. This state is assigned to one pattern. A total of 16 patterns are possible upon counting up the number of patterns. Considering that flags are assigned to all of these patterns to identify them, 4-bit data is necessary. FIG. 4 depicts the flags and patterns which are associated with each other, and the flags will be referred to as pattern flags hereinafter. Referring to FIG. 4, flags 0 to E indicate the pseudo halftone images described with reference to FIG. 3, and flag F indicates a multiple gray-level image.

Figure 5A:
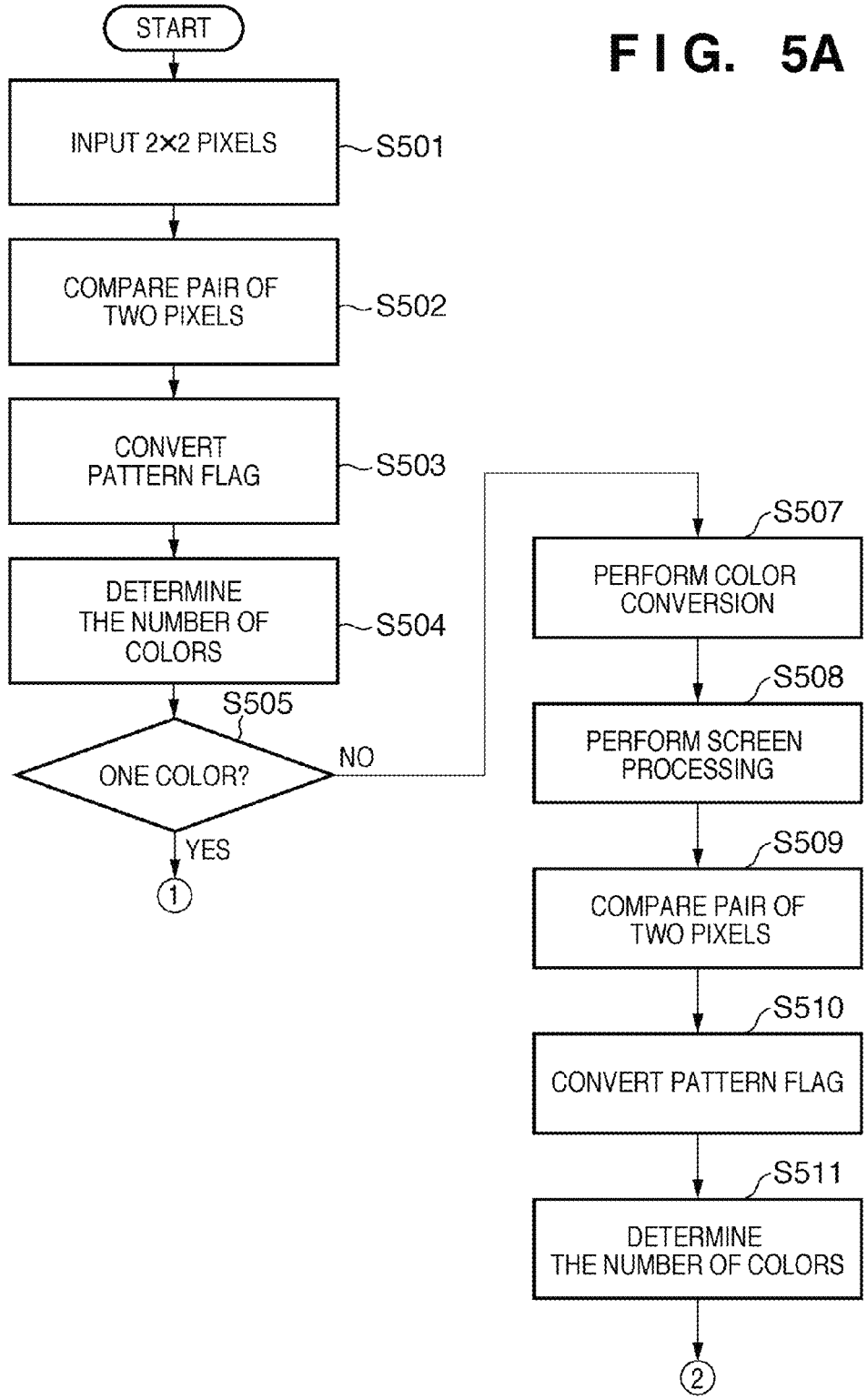

The sequence of processing by the compression units 202 and 252 will be described with reference to FIGS. 5A and 5B in consideration of possible combinations of 2×2 pixels as mentioned above. Note that in this embodiment, the input has, for example, R, G, and B (Red, Green, and Blue) components each with 8 bits and 256 gray levels, and 24-bit data per pixel in a dot sequential system of 8-bit data is used. However, the present invention is not limited to this setting, and the number of bits may be changed as needed, so data represented by a CMYK color space, grayscale data, or data having pixel values other than 8 bits may be adopted. In this case, the data size to be described hereinafter changes, as a matter of course.

First, a block divided in 2×2 pixels is input (S501). For all combinations of two pixels within the input block, sets of 24 bits of these pixels are compared (S502). If it is determined as a result of this comparison that all the bits coincide with each other (that is, that the two pixels have the same pixel value), 1 is output; otherwise, 0 is output. The process in step S502 will be described in more detail with reference to FIG. 6. Assuming that the upper left, upper right, lower left, and lower right pixels of a block including 2×2 pixels have coordinate positions 1, 2, 3, and 4, respectively, a total of six sets of two pixels 1-2, 1-3, 1-4, 2-3, 2-4, and 3-4 exist. Hence, six comparisons must be made, so 6 bits are output as a result. For example, if all of the four pixels have the same color, is are output as all comparison results; or if all of the four pixels have different pixel values, 0s are output as all comparison results. As described earlier, 15 patterns may occur upon color matching among the four pixels, so the 6-bit comparison results can be assigned with a 4-bit pattern flag and converted into it (S503).

After the conversion into a 4-bit pattern flag, the number of colors that have occurred in the four pixels and color pixel data (color information) are extracted (S504). The positions of second and subsequent colors assuming that the upper left pixel in the block of 2×2 pixels has a first color can be obtained from the pattern flag.

Figure 7A:
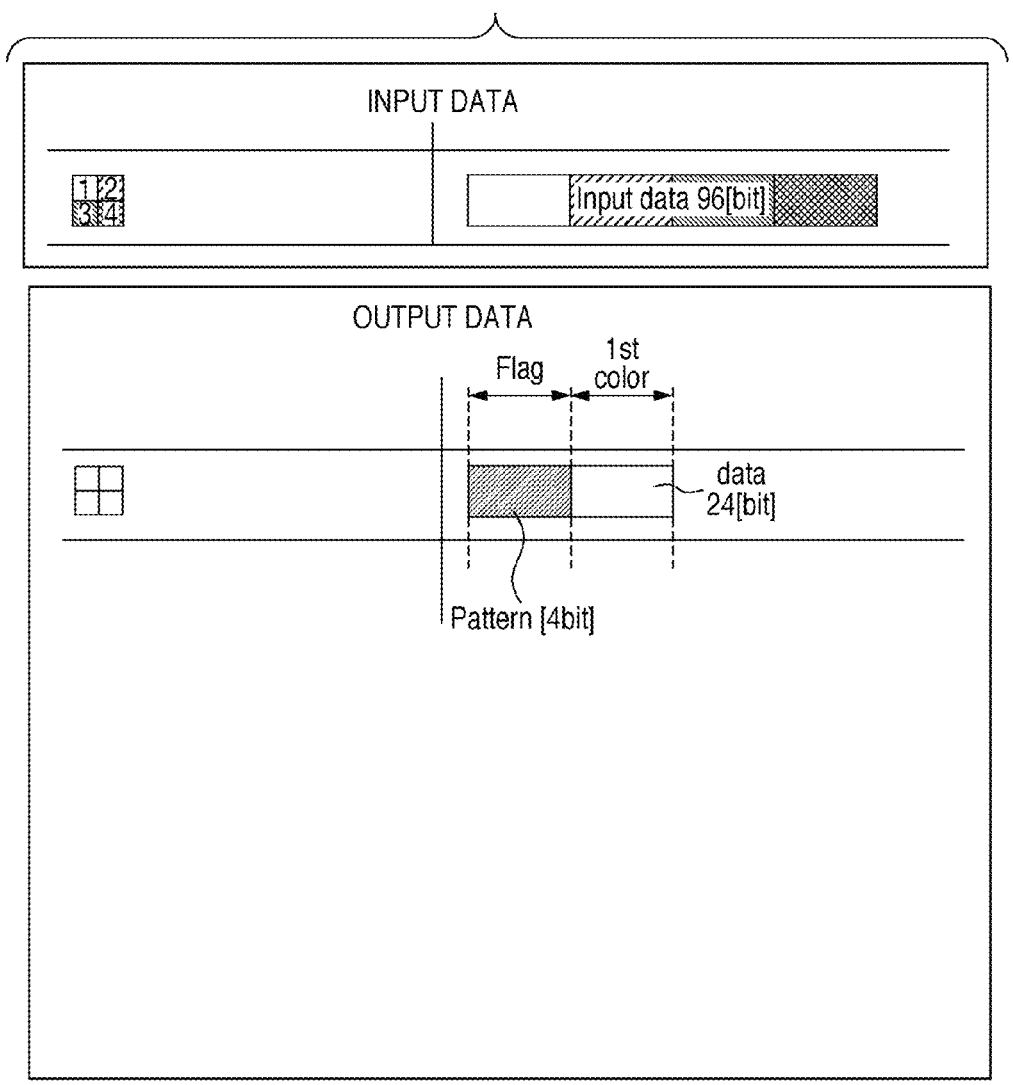
FIGS. 7A and 7B are views showing the input and output upon compression processing according to the first embodiment.

The processes in steps subsequent to step S504 will be described herein with reference to FIG. 7A. If it is confirmed in step S504 that the four pixels have only one color, the multilevel image is to be output intact, so it is determined in step S505 that only one color exists (none of the second and subsequent colors exist). Note that in step S505, it is determined whether the number of extracted colors is equal to or larger than a predetermined number (it is determined whether the four pixels have only one color). Then, the pattern flag is changed to flag F, and 24 bits of the first color are output (S506). If it is confirmed in step S504 that the four pixels have two or more colors, the RGB image data is converted into that in a CMYK color space (each color has 8 bits) in order to obtain a pseudo halftone image (S507). Color processing for density adjustment and adjustment which uses, for example, printer gamma correction is performed for the C, M, Y, and K values of the converted data, and the processed data undergoes screen processing using the dither method, thereby converting (quantizing) the data into data with 4 gray levels per pixel (2 bits) (S508). The data may be converted into that with 4 bits or 1 bit in place of that with 2 bits by changing the dither threshold.

A block of 2×2 pixels having undergone pseudo halftone processing is input, and for all combinations of two pixels within the input block, sets of 8 bits of these pixels are compared (S509). If it is determined as a result of this comparison that all the bits coincide with each other, 1 is output; otherwise, 0 is output. As shown in FIG. 6, assuming that the upper left, upper right, lower left, and lower right pixels of a block including 2×2 pixels have coordinate positions 1, 2, 3, and 4, respectively, a total of six sets of two pixels 1-2, 1-3, 1-4, 2-3, 2-4, and 3-4 exist. Hence, six comparisons must be made, so 6 bits are output as a result. For example, if all of the four pixels have the same color, is are output as all comparison results; or if all of the four pixels have different pixel values, 0s are output as all comparison results. As described earlier, 15 patterns may occur upon color matching among the four pixels, so the 6-bit comparison results can be converted into a 4-bit pattern flag (S510).

After the conversion into a 4-bit pattern flag, the number of colors that have occurred in the four pixels and color pixel data are extracted (S511). Although the number of colors and color pixel data are extracted again in this step, the results obtained in step S511 may be different from those obtained by the color count determination processing in step S504 because the block to be processed has already undergone the screen processing (S508). Namely, even pixels which have a slight color difference between them in the multilevel image are converted into those in the same color after quantization, and are therefore determined as pixels in the same color after pseudo halftone processing. Thus, color acquisition and arrangement acquisition are performed. The positions of second and subsequent colors assuming that the upper left pixel in the block of 2×2 pixels has a first color can be obtained from the pattern flag. The processes in steps subsequent to step S511 will be described herein with reference to FIG. 7B. If it is confirmed in step S511 that the four pixels have only one color, none of the second and subsequent colors exist, so it is determined in step S512 that only one color exists. Then, 4 bits of the pattern flag and 8 bits (2 bits for each of C, M, Y, and K) of the first color of the pixels in the block of interest are output (S513). However, if it is confirmed in step S511 that the four pixels have two colors, it is determined in step S514 that two colors exist. Then, the coordinate position of a pixel having the pixel value of the second color in the block of interest is calculated from the pattern flag, and 4 bits of the pattern flag and 16 bits (8 bits×2 pixels) of the pixel values of the two colors are output (S515). The same processing is performed when the four pixels have three or four colors as well (S516 and S517 or S518). At this time, color data that have not previously occurred are stored in ascending order of coordinate position of the pixel in the block (in the order of the upper left, upper right, lower left, and lower right pixels).

In this manner, the amount of output data can be reduced with relatively simple processing for input data of 96 bits (8 bits×3 colors×4 pixels) for four colors within a block including 2×2 pixels by acquiring and outputting a 4-bit pattern flag and pixel values, the number of which is equal to that of colors existing in this data. Also, the number of colors within the block can be specified by referring to the pattern flag. Moreover, the pixel value of each pixel included in the block can be specified based on the pattern flag and the order in which the colors are stored. Data compression of the entire image field can be performed by performing this processing for all image blocks.

[Rasterization into Raster Image Data]

Figure 7B:
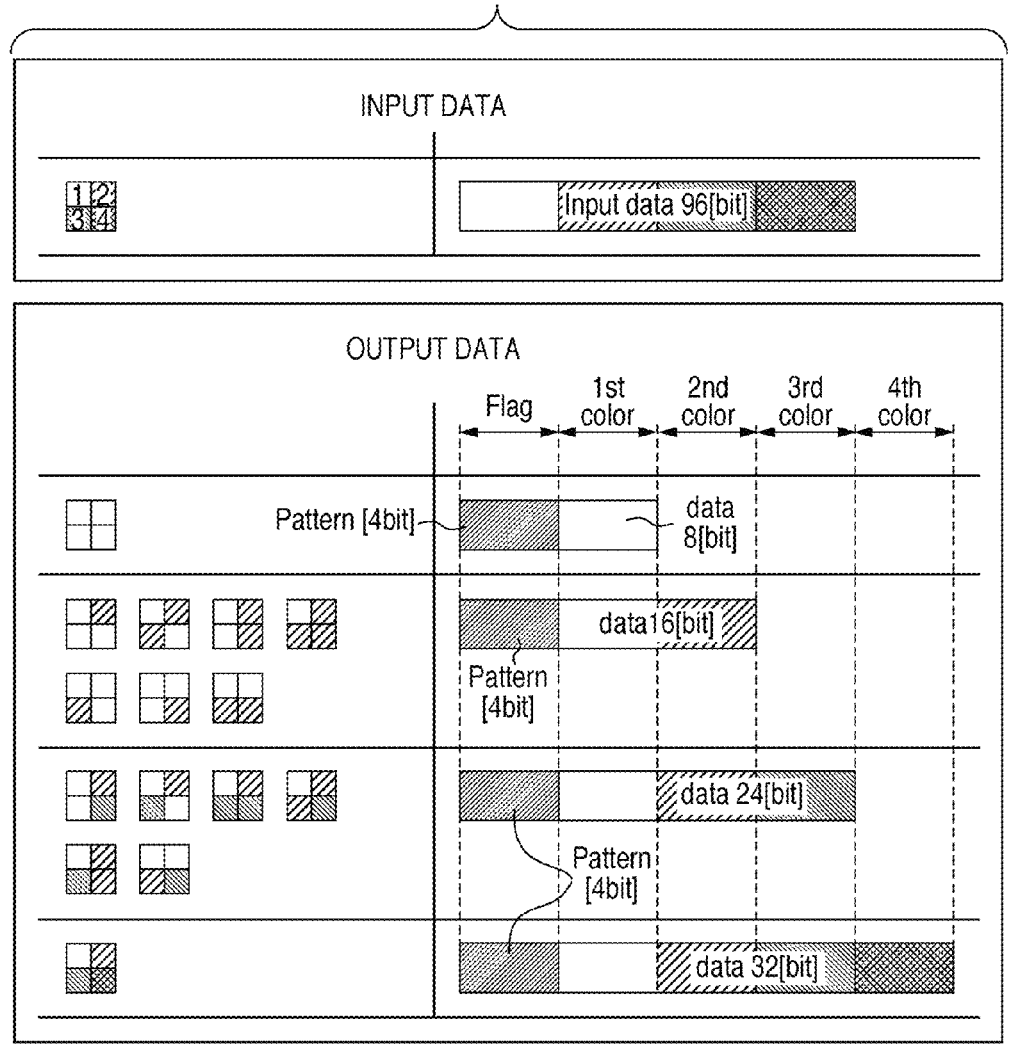
Figure 12:
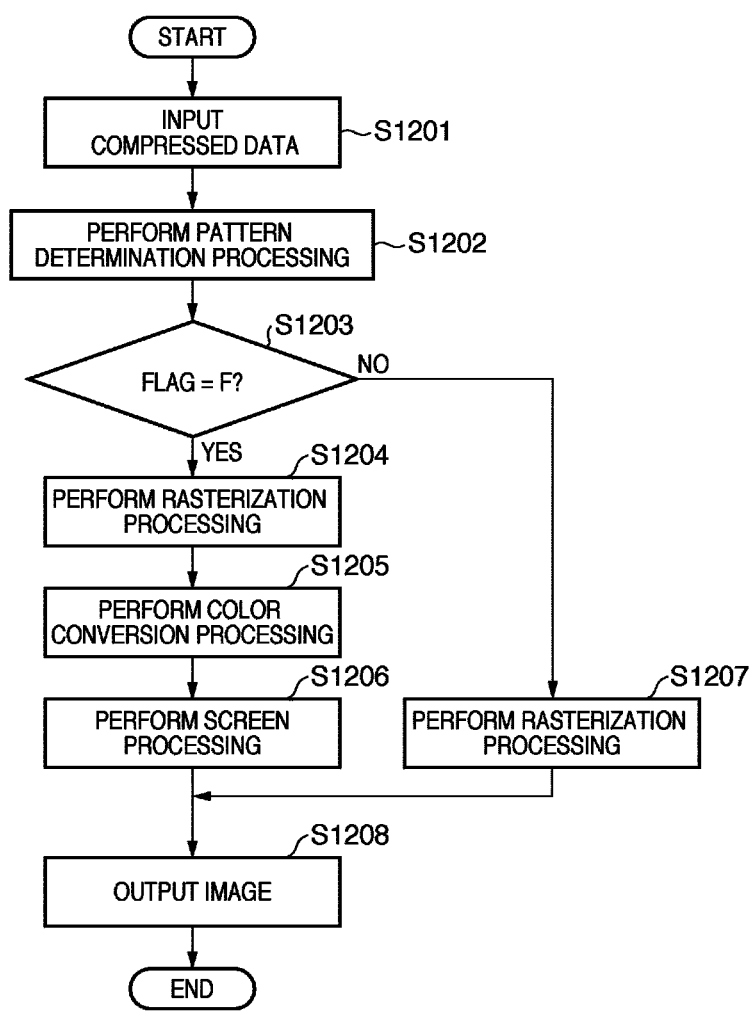
FIG. 12 is a flowchart showing the sequence of rasterization processing according to the embodiment.

The processing by the rasterization units 222 and 232 paired with the above-mentioned compression units will be described next with reference to FIG. 12. The processing by the rasterization units 222 and 232 performs processing of restoring the compressed image data to the original raster image data based on a pattern flag and color information as described earlier. The pattern flag writing start address, the first-color writing start address, and three addresses of the second-, third-, and fourth-color writing start addresses of the compressed data arranged on the memory as shown in FIG. 7B are designated on the DMACs 221 and 231. The DMACs 221 and 231 read out data from the three designated addresses, and input these data to the rasterization units 222 and 232 (S1201). The rasterization units 222 and 232 determine the 4-bit pattern flag first (S1202).

If the pattern flag is pattern flag F (YES in step S1203), the block of interest represents a multiple gray-level image in only one color, so the first color data is rasterized for each pixel in the block of 2×2 pixels (S1204). The rasterized image data is converted into that in a CMYK color space in order to obtain a pseudo halftone image (S1205). Color processing for density adjustment and adjustment which uses, for example, printer gamma correction is performed for the C, M, Y, and K values of the converted data, and the processed data undergoes screen processing using the dither method (S1206). The rasterized image data is output (S1208).

If the pattern flag is not pattern flag F (NO in step S1203), the number of colors within the block of interest is calculated. In addition to the first color data, the second, third, and fourth color data are read out in accordance with the number of colors, and the pixel data is rearranged in accordance with the pattern flag. With the foregoing processing, the block of 2×2 pixels in the image data compressed by the above-mentioned compression units is rasterized and decoded.

Figure 9A:
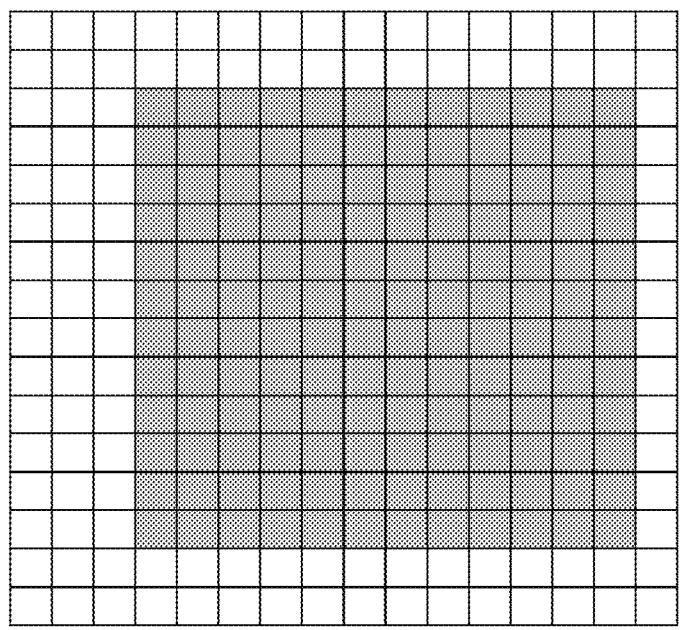
FIGS. 9A and 9B are views illustrating examples in which dither processing according to the embodiment is applied.
Figure 9B:
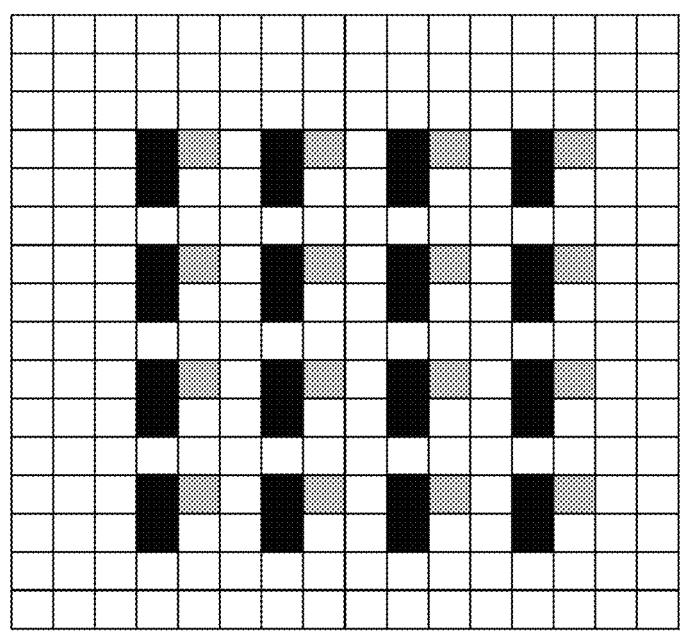

Compression processing will be described in detail below by taking a practical image as an example. Assume herein that the input image is a gray image with 8 bits and 256 gray levels, and the output image is a gray pseudo halftone image with 2 bits and 4 gray levels. FIG. 9A is a view showing image data obtained by multiple gray-level representation of a gray (gray level 70) rectangular image. FIGS. 8A to 8D show dither matrices used in the dither method according to this embodiment. FIG. 8A shows a dither matrix with a depth of 3, FIG. 8B shows a dither matrix with a depth of 4, FIG. 8C shows a dither matrix with a depth of 2, and FIG. 8D shows a dither matrix with a depth of 1. FIG. 9B shows image data obtained by pseudo halftone representation of the image data shown in FIG. 9A by the dither method using these dither matrices.

Figure 10A:
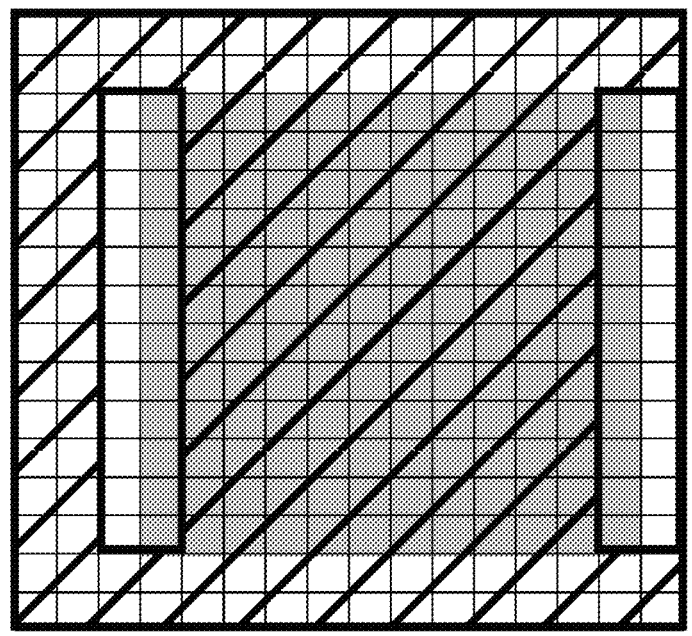
FIGS. 10A and 10B are views showing the determination results of compression processing according to the first embodiment.
Figure 10B:
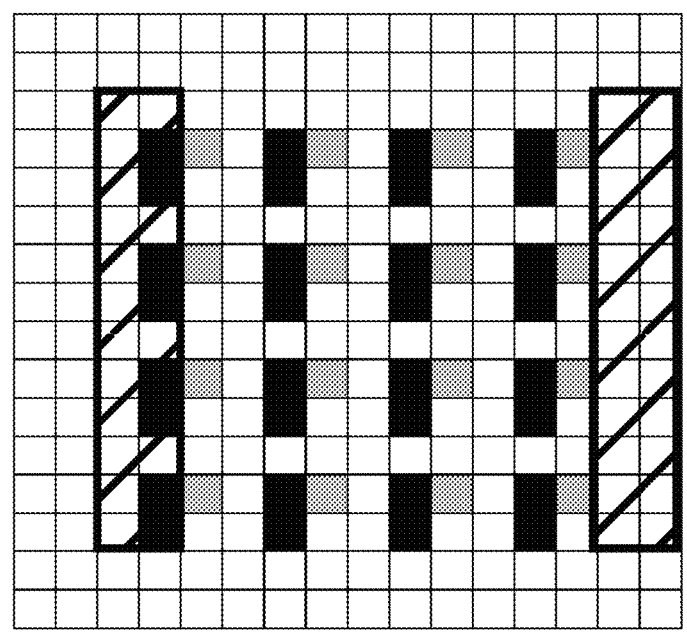

FIG. 10A shows the result of the color count determination processing (S504) when the compression processing according to this embodiment is applied to the image data shown in FIG. 9A. Blocks indicated by hatched lines in FIG. 10A have data in only one color, and therefore undergo the compression processing according to this embodiment while maintaining their multiple gray-level representation. On the other hand, portions other than those indicated by the hatched lines are converted into pseudo halftone representation (corresponding to hatched portions in FIG. 10B). After the conversion into a pseudo halftone image, this image undergoes the compression processing according to this embodiment. FIG. 11 is a table showing the pattern flag for each block of 2×2 pixels and the data size. In case of FIG. 9A, an output image with 1,648 bits is finally obtained in correspondence with an input image with 2,048 bits.

With the above-mentioned configuration, the memory capacity and the memory bus bandwidth can be saved using a relatively simple compression scheme.

Second Embodiment

Another embodiment of the compression units for raster image data described in the first embodiment will be explained in the second embodiment. In the first embodiment, not only a solid gray image but also a solid white image and a solid black image are determined as multiple gray-level images, and undergo compression processing. Each of a solid white image and a solid black image is represented in one color despite their pseudo halftone representation, so the compression effect can be enhanced by converting these images into pseudo halftone images and performing their compression processing. Namely, a color, the value of which remains unchanged before and after pseudo halftone processing, is taken into consideration. In view of this, a compression method which also focuses attention on the color value will be described, in place of the compression processing in which only the calculation result of the number of colors is used and which has been described in the first embodiment.

Figure 13A:
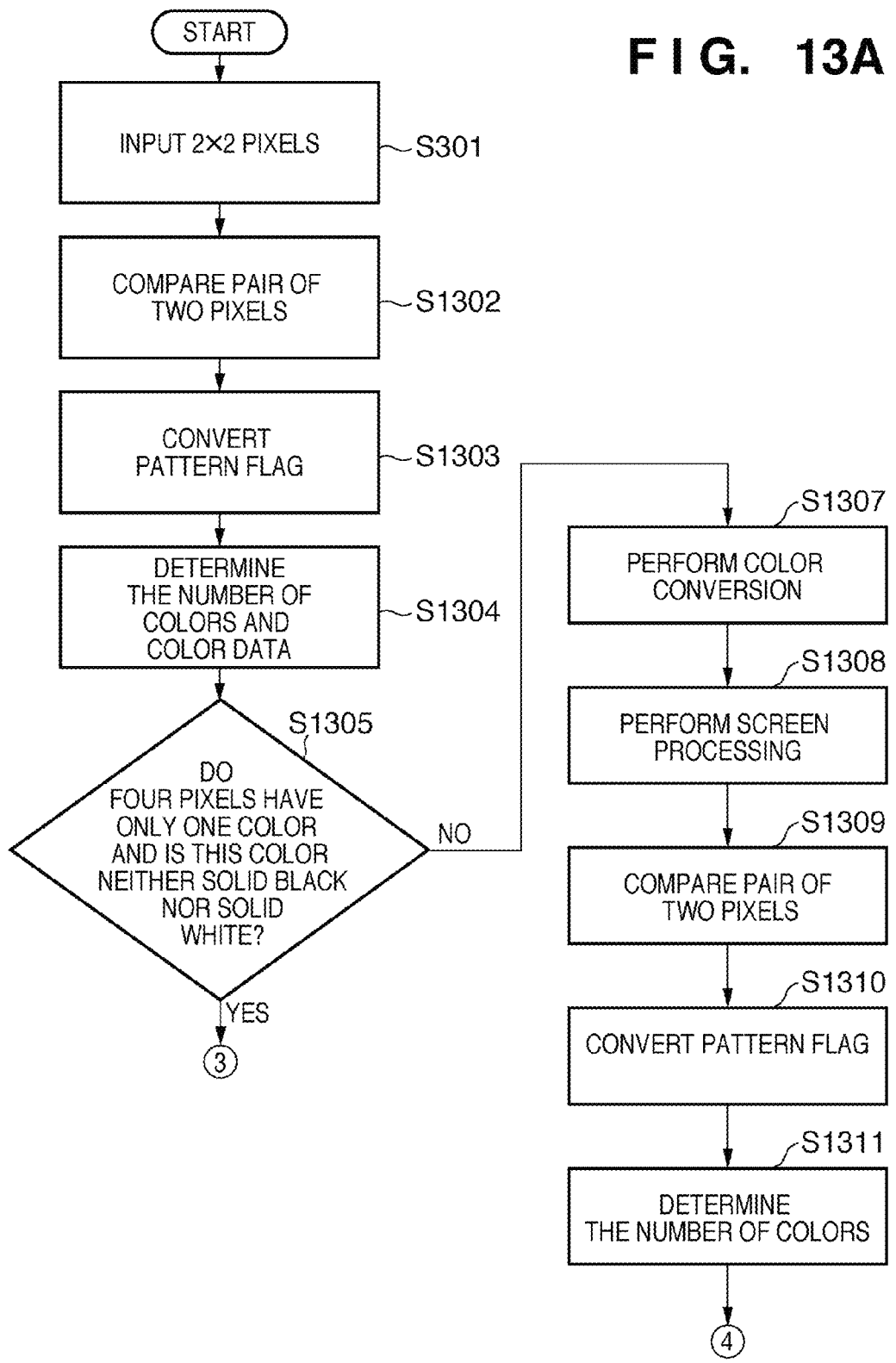
FIGS. 13A and 13B are flowcharts showing the sequence of image compression according to the second embodiment.
Figure 13B:
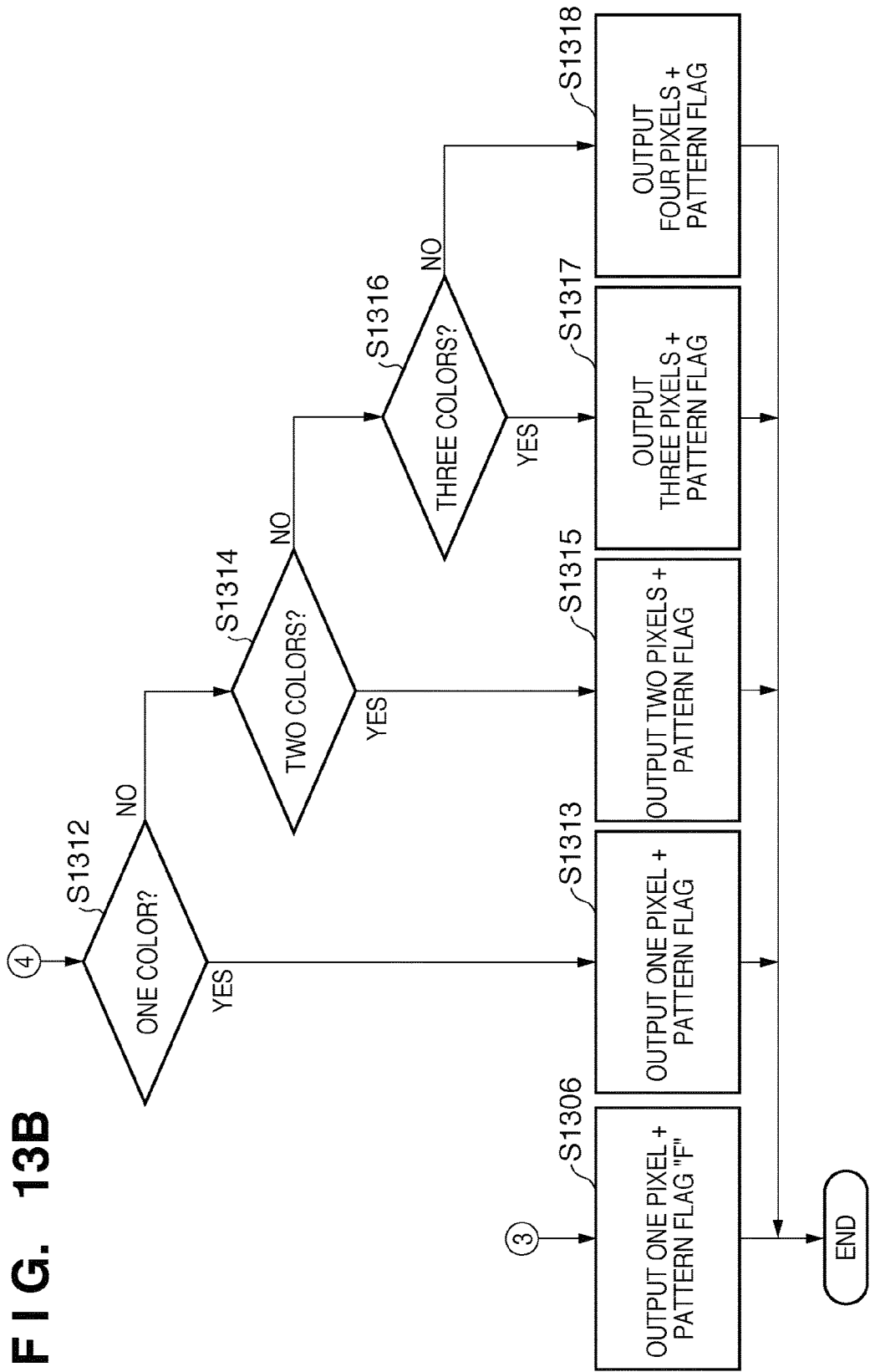

The sequence of processing by compression units 202 and 252 will be described with reference to FIGS. 13A and 13B. The processes other than those in steps S1304 and S1305 are the same as in steps S501 to S503 and S506 to S518 in FIGS. 5A and 5B described in the first embodiment, and a description thereof will not be given herein.

After the conversion into a 4-bit pattern flag in step S1303 (corresponding to step S503 in FIG. 5A), the number of colors that have occurred in the four pixels of the block of interest and color pixel data are extracted (S1304). The positions of second and subsequent colors assuming that the upper left pixel in the block of 2×2 pixels has a first color can be obtained from the converted pattern flag. The processes in steps subsequent to step S1304 will be described herein with reference to FIG. 7A. If it is determined in step S1304 that the condition in which the four pixels in the block of interest have only one color is satisfied, it is determined whether this color is black or white by referring to the color pixel data (S1305). If the four pixels have only one color and this color is neither white nor black (YES in step S1305), the multilevel image is to be output intact, so the pattern flag is changed to pattern flag F, and 4 bits of the pattern flag and 24 bits of the first color are output (S1306).

If the condition in which the four pixels have solid black or solid white or have two or more colors is satisfied (NO in step S1305), the image data is converted into that in a CMYK color space in order to obtain a pseudo halftone image (S1307). Note that step S1307 corresponds to S507 in FIG. 5A, and the processes in subsequent steps are the same as in FIGS. 5A and 5B.

Figure 14A:
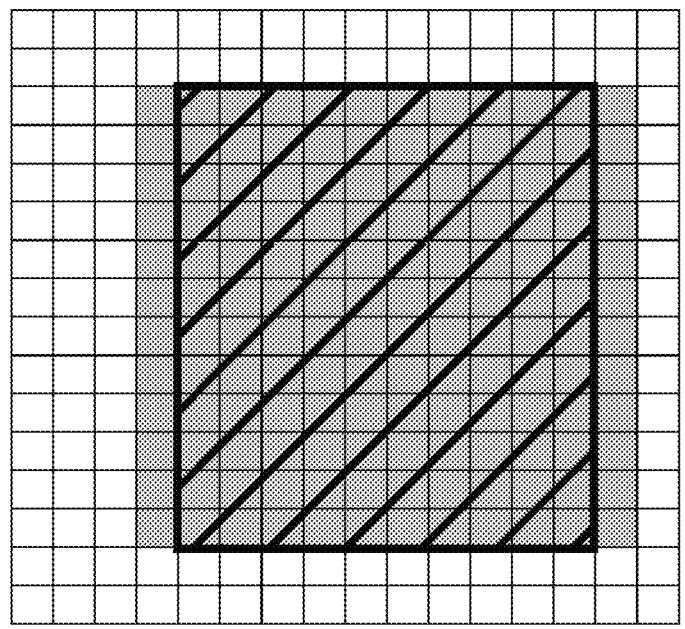
FIGS. 14A and 14B are views showing the determination results of compression processing according to the second embodiment.
Figure 14B:
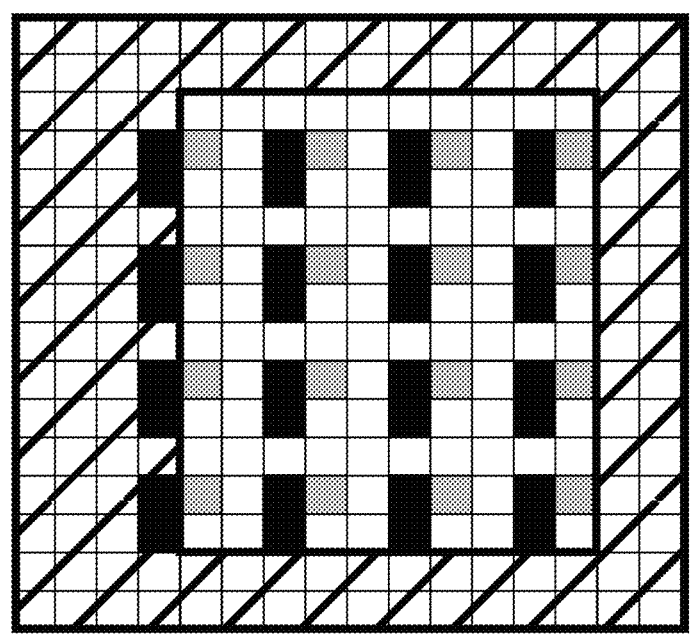

FIG. 14A shows the result of the color count determination processing (S1304) when the compression processing according to this embodiment is applied to the image data shown in FIG. 9A. Blocks indicated by hatched lines in FIG. 14A have data in only one color, and therefore undergo the compression processing according to this embodiment while maintaining their multiple gray-level representation. On the other hand, portions other than those indicated by the hatched lines are converted into pseudo halftone representation (corresponding to hatched portions in FIG. 14B). After the conversion into a pseudo halftone image, this image undergoes the compression processing according to this embodiment. FIG. 15 is a table showing the pattern flag for each block of 2×2 pixels and the data size. When the processing according to this embodiment is applied to the image data shown in FIG. 9A, an output image with 1,296 bits is finally obtained in correspondence with an input image with 2,048 bits. Note that a rasterization method in the second embodiment is the same as the processing described in the first embodiment.

With the above-mentioned configuration, the effect of saving the memory capacity and the memory bus bandwidth using a relatively simple compression scheme according to the first embodiment can further be enhanced.

Third Embodiment

Another embodiment of the compression units for raster image data described in the first and second embodiments will be explained in the third embodiment. An image expected to be highly compressed by the compression method according to this embodiment has a large number of regions regarded as having the same color based on the adjacent pixel values within the image, as described earlier. Upon focusing attention on such image regions, it is often the case that not only pixels in a single block of 2×2 pixels but also those in adjacent blocks of 2×2 pixels are regarded as having the same color. In view of this, a compression method which focuses attention not only on the uniformity of pixels in a single block, as in the compression method described in the first and second embodiments, but also on the uniformity of pixels in adjacent blocks will be described.

Figure 17A:
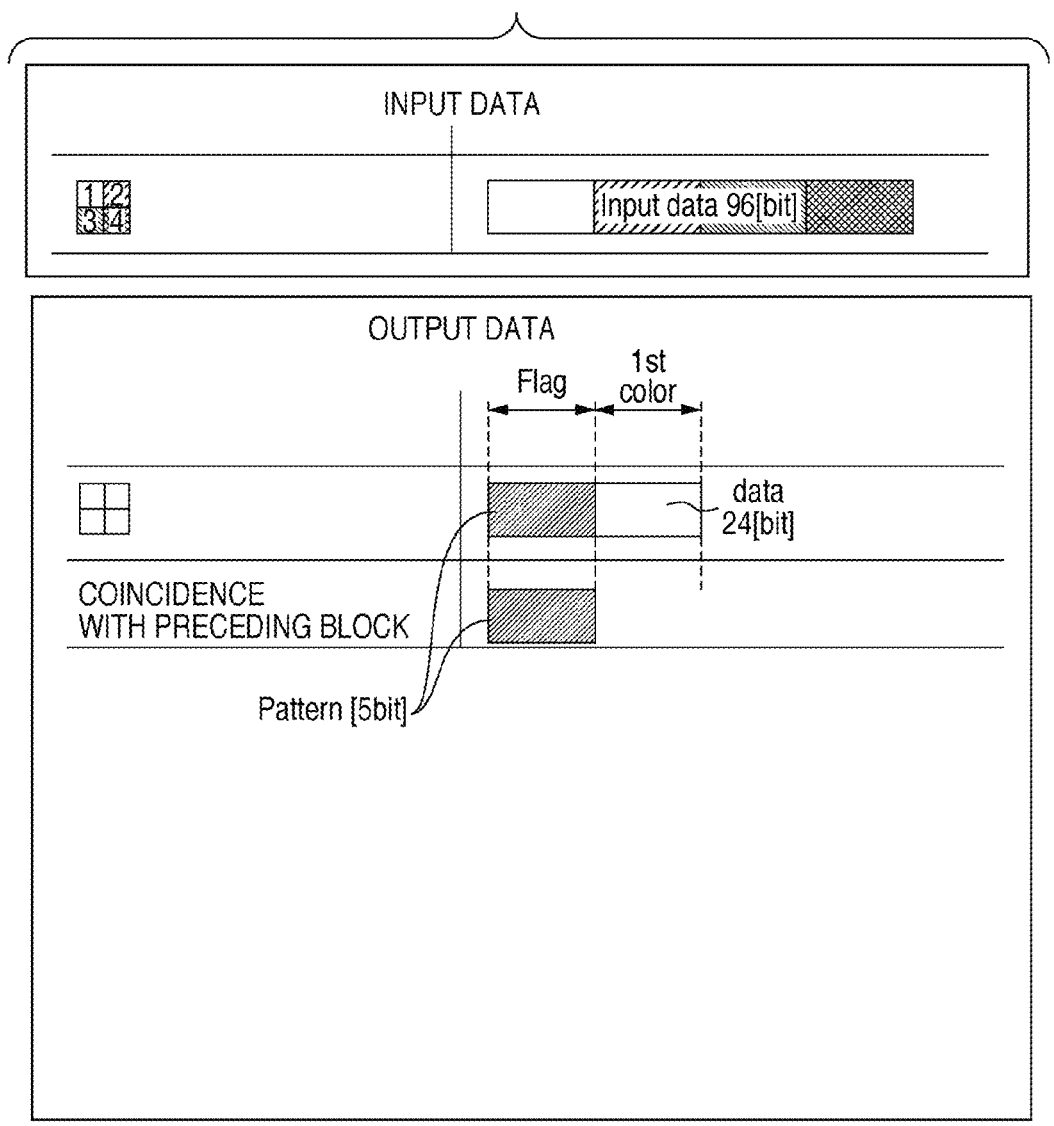
FIGS. 17A and 17B are views showing the inputs and outputs upon compression processing according to the third embodiment.
Figure 17B:
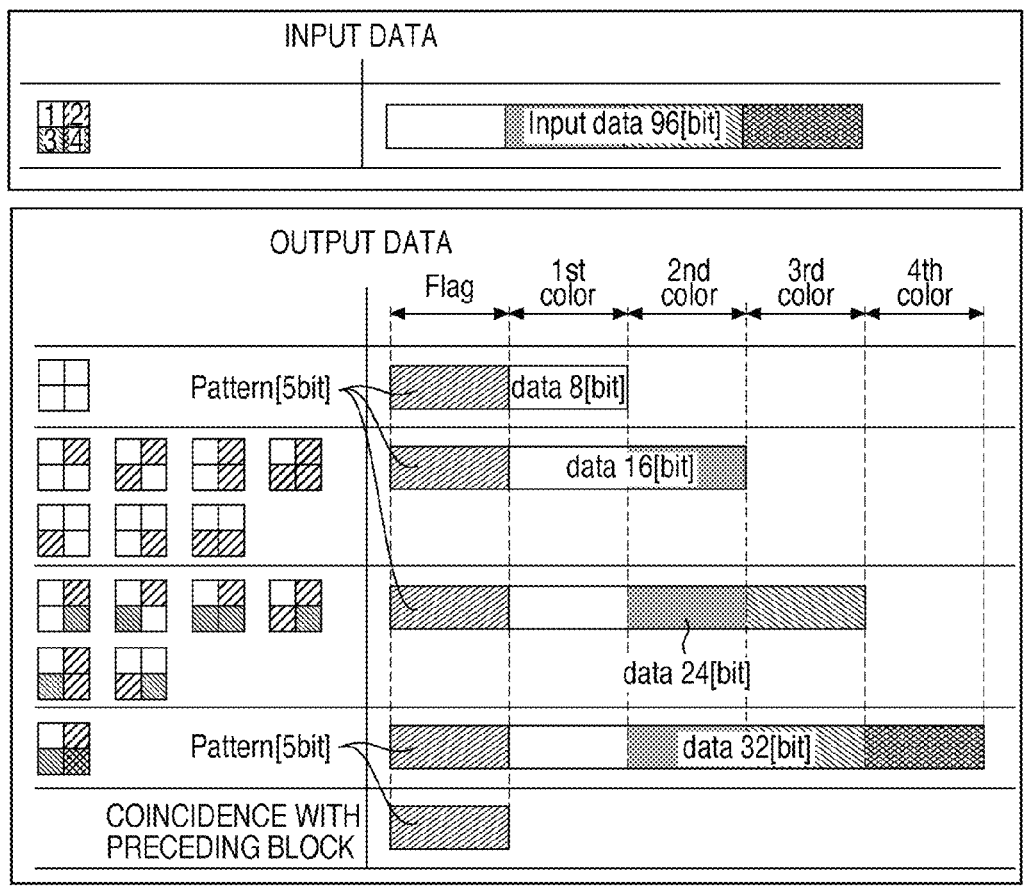

Referring to FIG. 4 described in the first embodiment, 16 patterns of pattern flags to which a block of 2×2 pixels may belong are represented using 4 bits. The pattern flag is expanded by 1 bit, and the pixel values of a block processed before the currently processed block are stored. If all pixels in the block of current interest coincide with those in the immediately preceding block processed immediately before it, a flag indicating that the block of current interest is identical to the immediately preceding block is set without outputting the pixel values of the block of current interest. The data can further be compressed by assigning the fifth bit. FIGS. 17A and 17B show the relationships between the inputs and outputs when a new pattern flag is added. In this embodiment, a pattern in which no pixel values are output is newly added.

[Compression Processing]

Figure 16:
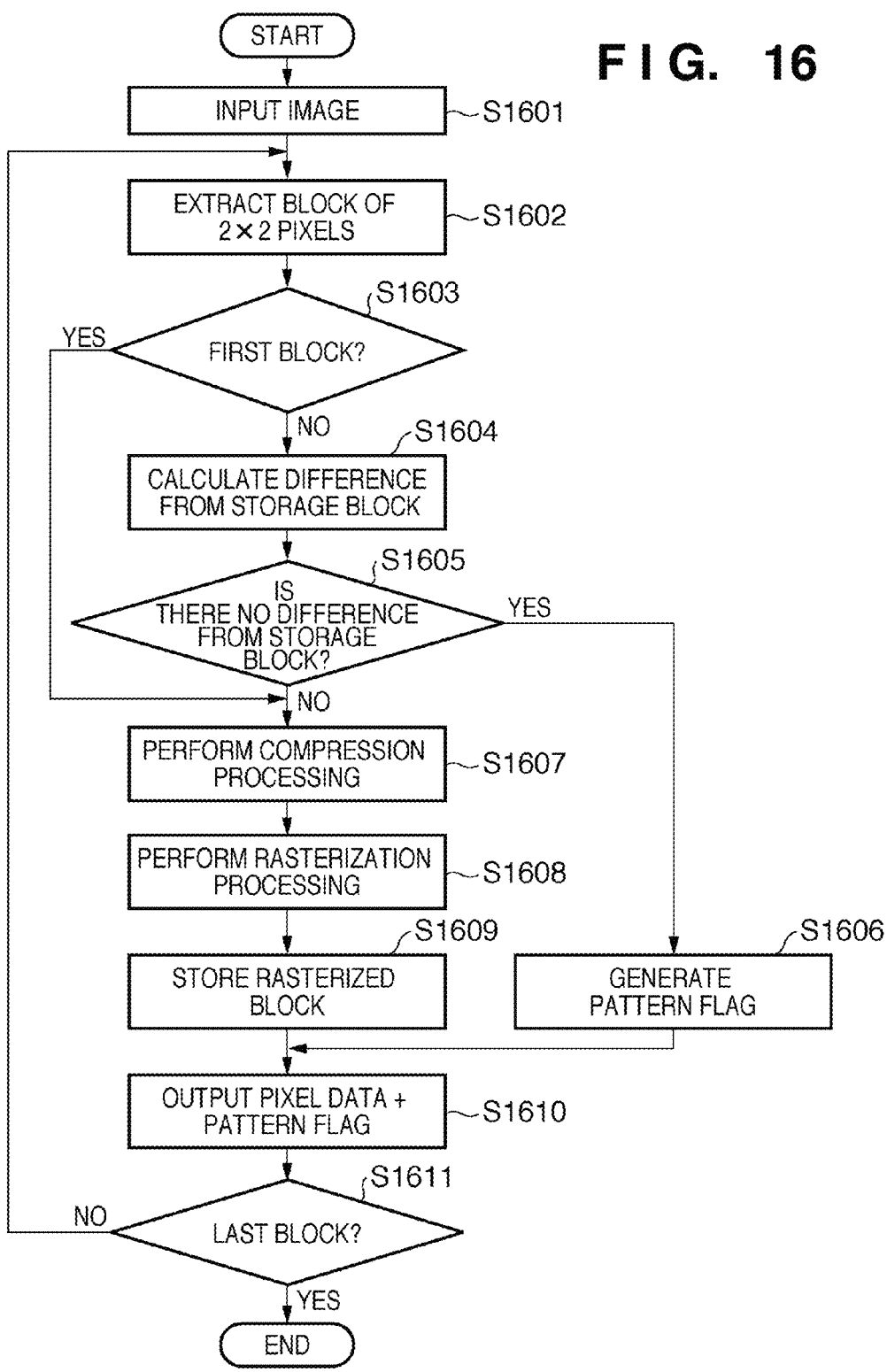
FIG. 16 is a flowchart showing the sequence of image compression according to the third embodiment.

The compression method according to the third embodiment will be described in detail with reference to FIG. 16. First, raster image data is input (S1601). A block of 2×2 pixels is extracted from the input raster image data (S1602). If the extracted block is the first block, no immediately preceding block exists (YES in step S1603), so compression processing is performed, as explained in the above-described embodiments (S1607). If the extracted block is not the first block (NO in step S1603), processing of calculating the difference from the storage block having been processed immediately before it and stored is performed (S1604). The processing in step S1604 can be done by, for example, obtaining the sum of the absolute values of the differences between the pixel values at identical coordinate positions. If the extracted block has no difference from the storage block (YES in step S1605), a pattern flag indicating that the block of interest is identical to the preceding block is generated (S1606), and no pixel data is output. With the foregoing procedure, replacement determination for determining whether the block of interest can be replaced with the preceding block is performed. Also, the pattern flag generated herein corresponds to "Coincidence with Preceding Block" shown in FIGS. 17A and 17B. Conversely, if the block of interest has a difference from the preceding block, it is determined that data on the preceding block cannot be reused (NO in step S1605), and compression processing is performed, as explained in the above-described embodiments (S1607). In subsequent block processing, the data compressed in step S1607 is rasterized in order to hold the block used for the comparison in step S1604 (S1608). The rasterized block of 2×2 pixels is stored as a storage block (S1609). In this processing, the already held storage block may be updated and held. Also, the processing associated with storing a block may be performed before the compression processing in step S1607. Normal compression processing as described earlier is performed and a pattern flag and pixel data (color information) are output for a block with a difference from the storage block, while only a pattern flag is output for a block with no difference from the storage block (S1610). It is determined whether the extracted block is the last block. If the extracted block is not the last block (NO in step S1611), the foregoing processing is repeated until the entire image is compressed. If the extracted block is the last block (YES in step S1611), the processing ends.

[Rasterization Processing]

Rasterization units paired with the compression units will be described next. The output of the preceding block can be used as that of the block of interest if the latter block is identified as being identical to the former block upon referring to the pattern flag of the latter block in rasterization, and rasterization can be done using the above-mentioned method if a flag other than that indicating to that effect is obtained. At this time, one block must be buffered because it may be used for the next block.

Compression processing will be described in detail below by taking a concrete image as an example. Assume herein that the input image is a gray image with 8 bits and 256 gray levels, and the output image is a gray pseudo halftone image with 2 bits and 4 gray levels, as in the above-described embodiments. FIG. 18A is a table showing the pattern flag for each block of 2×2 pixels and the data size when the processing according to this embodiment described with reference to FIG. 16 is applied to the image data shown in FIG. 9A. The processing is performed based on the sequence of processing (FIGS. 5A and 5B) according to the first embodiment. In this case, the image data shown in FIG. 9A finally becomes an output image with 784 bits in correspondence with an input image with 2,048 bits. Similarly, FIG. 18B is a table showing the pattern flag for each block of 2×2 pixels and the data size when the processing according to this embodiment is performed based on the sequence of processing (FIGS. 13A and 13B) according to the second embodiment. In this case, the image data shown in FIG. 9A finally becomes an output image with 640 bits in correspondence with an input image with 2,048 bits.

In this manner, by associating the block of interest with the block processed before it with a configuration which focuses attention on the uniformity of adjacent blocks, the redundancy between blocks can be reduced to further enhance the compression ratio, in addition to the effect of the above-described embodiments.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-059924, filed Mar. 16, 2010, which is hereby incorporated by reference herein in its entirety.

What is claimed is:

1. An image processing apparatus which compresses input image data, comprising:

a division unit which divides the input image data into blocks each including a predetermined number of pixels;

a determination unit which determines, for each of the blocks divided by said division unit, whether a number of colors that is a number of types of colors of the pixels included in the block is not less than a predetermined number;

a halftone processing unit which performs halftone processing of image data of blocks for which it is determined by said determination unit that the number of colors is not less than the predetermined number, wherein said halftone processing unit does not perform the halftone processing of image data of blocks for which it is determined that the number of colors is less than the predetermined number;

an acquisition unit which acquires a color arrangement and color information in each of blocks for which it is determined by said determination unit that the number of colors is less than the predetermined number, and further acquires a color arrangement and color information in each of blocks having undergone the halftone processing by said halftone processing unit; and a storage unit which stores the color arrangement and the color information acquired by said acquisition unit, wherein said storage unit further stores a block, processed before a currently processed block, the image processing apparatus further comprises a replacement determination unit which determines whether the currently processed block can be replaced with the block stored in said storage unit, and in a case where said replacement determination unit determines that the currently processed block can be replaced with the block stored in said storage unit, the currently processed block is associated with the block stored in said storage unit.

2. The apparatus according to claim 1, wherein the predetermined number is two.

3. The apparatus according to claim 1, wherein the color arrangement acquired by said acquisition unit includes a pattern associated with a combination of the color arrangement.

4. The apparatus according to claim 1, wherein said storage unit stores pieces of color information in an order corresponding to the color arrangement acquired by said acquisition unit.

5. An image processing apparatus which compresses input image data, comprising:

a division unit which divides the input image data into blocks each including a predetermined number of pixels;

a determination unit which determines, for each of the blocks divided by said division unit, whether a number of colors that is a number of types of colors of the pixels included in the block is a predetermined number and the color is not a predetermined color;

a halftone processing unit which performs halftone processing of image data of blocks for which it is determined by said determination unit that the number of colors is not the predetermined number or the color is the predetermined color, wherein said halftone processing unit does not perform the halftone processing of image data of blocks for which it is determined that the number of colors is the predetermined number and the color is not the predetermined color;

an acquisition unit which acquires a color arrangement and color information in each of blocks for which it is determined by said determination unit that the number of colors is the predetermined number and the color is not the predetermined color, and further acquires a color arrangement and color information in each of blocks having undergone the halftone processing by said halftone processing unit; and a storage unit which stores the color arrangement and the color information acquired by said acquisition unit, wherein said storage unit further stores a block, processed before a currently processed block, the image processing apparatus further comprises a replacement determination unit which determines whether the currently processed block can be replaced with the block stored in said storage unit, and in a case where said replacement determination unit determines that the currently processed block can be replaced with the block stored in said storage unit, the currently processed block is associated with the block stored in said storage unit.

6. The apparatus according to claim 5, wherein the predetermined number is one and the predetermined color is a color unchanged before and after the halftone processing.

7. A control method for an image processing apparatus which compresses input image data, comprising:

a division step of causing a division unit of the image processing apparatus to divide the input image data into blocks each including a predetermined number of pixels;

a determination step of causing a determination unit of the image processing apparatus to determine, for each of the blocks divided in said division step, whether the number of colors that is the number of types of colors of the pixels included in the block is not less than a predetermined number;

a halftone processing step of causing a halftone processing unit of the image processing apparatus to perform halftone processing of image data of blocks for which it is determined in the determination step that the number of colors is not less than the predetermined number, wherein the halftone processing is not performed for blocks for which it is determined that the number of colors is less than the predetermined number;

an acquisition step of causing an acquisition unit of the image processing apparatus to acquire a color arrangement and color information in each of blocks for which it is determined in the determination step that the number of colors is less than the predetermined number, and further acquires a color arrangement and color information in each of blocks having undergone the halftone processing in the halftone processing step; and a storage step of causing a storage unit of the image processing apparatus to store the color arrangement and the color information acquired in the acquisition step;

wherein, in the storage step, a block processed before a currently processed block is further stored, the method further comprises a replacement determination step of causing a replacement determination unit of the image processing apparatus to determine whether the currently processed block can be replaced with the block stored in said storage unit, and in a case where, in the replacement determination step, it is determined that the currently processed block can be replaced with the block stored in said storage unit, the currently processed block is associated with the block stored in said storage unit.

8. A non-transitory computer-readable medium storing a program for causing a computer to function as:

a division unit which divides the input image data into blocks each including a predetermined number of pixels;

a determination unit which determines, for each of the blocks divided by said division unit, whether the number of colors that is the number of types of colors of the pixels included in the block is not less than a predetermined number;

a halftone processing unit which performs halftone processing of image data of blocks for which it is determined by the determination unit that the number of colors is not less than the predetermined number, wherein said halftone processing unit does not perform the halftone processing of image data of blocks for which it is determined that the number of colors is less than the predetermined number;

an acquisition unit which acquires a color arrangement and color information in each of blocks for which it is determined by the determination unit that the number of colors is less than the predetermined number, and further acquires a color arrangement and color information in each of blocks having undergone the halftone processing by the halftone processing unit;

a storage unit which stores the color arrangement and the color information acquired by the acquisition unit, wherein said storage unit further stores a block, processed before a currently processed block; and a replacement determination unit which determines whether the currently processed block can be replaced with the block stored in said storage unit, and wherein in a case where said replacement determination unit determines that the currently processed block can be replaced with the block stored in said storage unit, the currently processed block is associated with the block stored in said storage unit.

\* \* \* \* \*